Nov. 7, 1944.  A. T. NEWELL  2,362,297
JETTISON TANK VALVE
Filed March 4, 1943
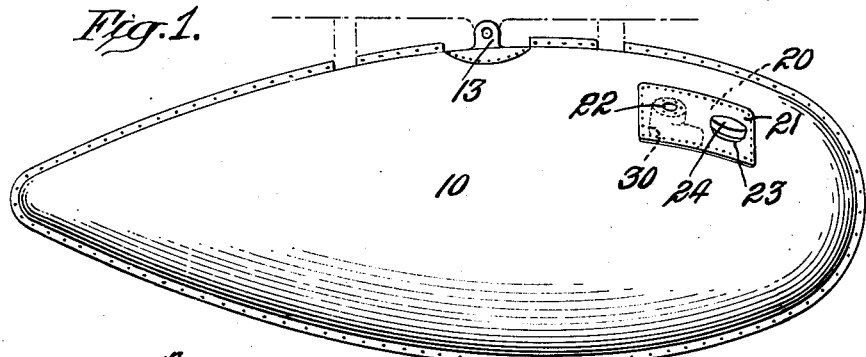
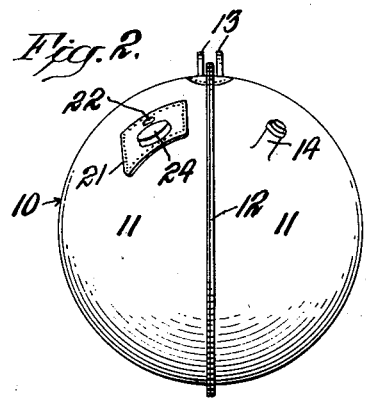
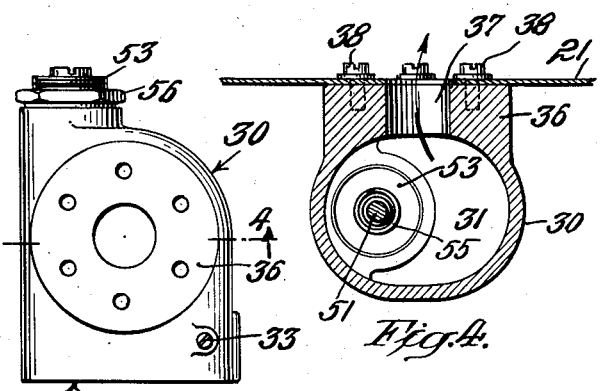
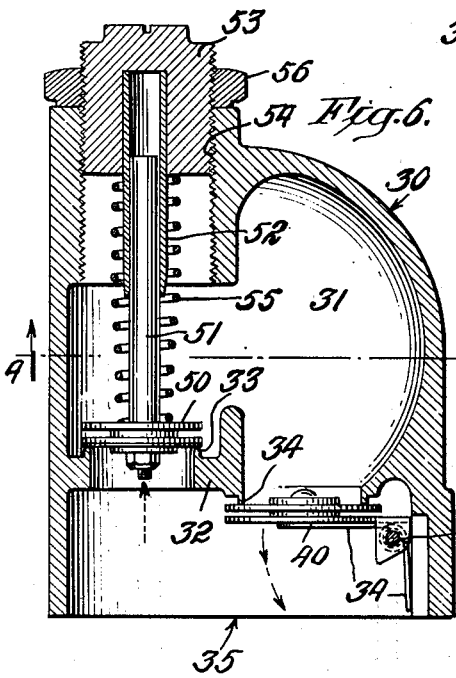
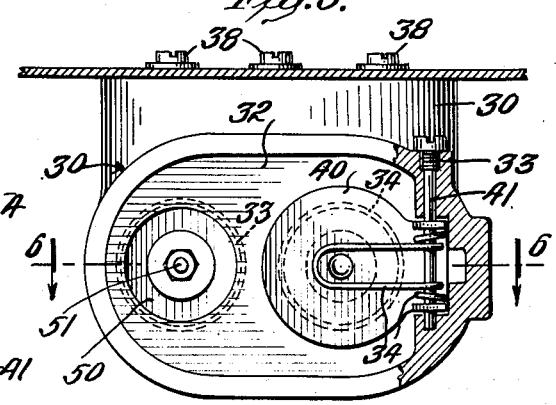
INVENTOR
ARTHUR T. NEWELL
BY
ATTORNEY Patented Nov. 7, 1944

2,362,297

UNITED STATES PATENT OFFICE 2,362,297

JETTISON TANK VALVE

Arthur T. Newell, Huntington, N. Y., assignor to Kenyon Instrument Co., Inc., Huntington Station, N Y., a corporation of New York Application March 4, 1943, Serial No. 478,053

1 Claim. (Cl. 244—135)

This invention relates to a valve assembly for jettison gasoline tanks of the type used for increasing the range of airplanes and designed to be jettisoned or dropped when no longer required. Such tanks are commonly designed to be attached to the bomb rack of a bomber plane and occupy the space normally assigned to the bombs. The tanks are arranged to be released by actuation of the bomb release mechanism.

There are several essential characteristics of a tank of the above type. It must, for example, have an outer surface of smooth, aerodynamic form as it is normally exposed during flight. It must also be made of cheap, non-critical material as such tanks may be used only once. The fittings must be such as to be readily releasable. A vent and pressure release valve must be provided in order to maintain the contents of the tank under atmospheric pressure and to vent any excessive pressure produced by vapor formation therein. Such valves must be normally closed so as to prevent leakage of the gasoline and to minimize evaporation. At the same time the valve assembly must be inexpensive and compact and must not destroy the aerodynamic properties of the outer surface of the tank.

It is an object of the present invention to provide a valve assembly which answers the above requirements Although the novel features which are believed to be characteristic of this invention are pointed out more particularly in the claim appended hereto, the invention itself may be better understood by referring to the following description, taken in connection with the accompanying drawing in which a specific embodiment thereof has been set forth for purposes of illustration.

In the drawing,

Fig. 1 is a side elevation of a jettison gas tank embodying the present invention;

Fig. 2 is a front elevation thereof;

Fig. 3 is a top plan view of the combination vent and pressure relief valve;

Fig. 4 is a transverse section taken on the line 4—4 of Fig. 3 and also on the line 4—4 of Fig. 6;

Fig. 5 is a front elevation of the valve of Fig. 3;

Fig. 6 is a horizontal section taken on the line 6—6 of Fig. 5.

In the following description certain specific terms are used for convenience in referring to various details of the invention. It is to be understood, however, that these terms are to be given as broad an interpretation as the state of the art will permit.

Referring to the drawing more in detail, the invention is shown as applied to a jettison gas tank 10 (Figs. 1 and 2) which is shown as formed of two half shells 11 having cooperating flanges 12 by which they are joined together. The outer surfaces of the shells 11 are of smooth, aerodynamic form so as to interpose a minimum of air resistance. The tank 10 is similar in shape and size to the usual bomb carried by the plane, and is provided with a lug 13 which is adapted to be attached to the releasable bomb control mechanism of the plane so that it may be dropped by releasing this mechanism. One of the shells 11 is shown as provided with a hose connection 14 which is adapted to be connected to the fuel hose of the plane for withdrawing fuel from the tank. The connection is of course such that it is readily broken when the tank is dropped.

The shell 11 is provided with a large opening 20 which is covered by a plate 21. The plate 21 carries the entire valve and filler assembly and is arranged so that these elements may be assembled as a unit before the plate is attached to the tank.

In the embodiment shown, the plate 21 is provided with a vent opening 22 and with a filler opening 23 which is closed by a filler cap 24 of any standard type. A valve housing 30 containing the combination pressure release and vent valve is mounted on the underside of the plate 21 and is so formed that the housing is located entirely within the confines of the plate, so that it may be readily passed through the opening 20 in the wall 11 of the tank.

As shown in Figs. 3 to 6, the housing 30 comprises a chamber 31 having a transverse wall 32 provided with oppositely faced valve seats 33 and 34. The chamber 31 is elliptical in section as shown in Fig. 5 and the entire end thereof is open to the interior of the tank as indicated at 35 (Fig. 6).

An annular boss 36 extends upwardly from the housing 30 and forms a vent opening 37 which communicates with the vent opening 22 of the plate 21. The boss 36 is secured to the under surface of the plate 21 by means of a plurality of screws 38 which extend through said plate into the upper surface of said boss. The screws 38 may, of course, be provided with small heads or these heads may be rounded to provide a smooth surface for air flow thereover.

The vent valve comprises a valve flapper 40 hinged to a pin 41 which is carried in the housing 30 and which may be secured therein by a screw thread 33. A spring 34 normally holds the valve flapper 40 closed against the seat 34, but is arranged to open at a very slight pressure differential so as to admit air from the atmosphere to the interior of the tank. The pin 41 is mounted to extend substantially vertically so that the valve flapper 40 swings in a substantially horizontal plane. In this way the spring 40 is not required to overcome the weight of the valve flapper when the plane is in normal flying position and sensitive adjustment is made possible.

The pressure relief valve comprises a valve 50 which is mounted on a valve stem 51 adapted to seat against the valve seat 33. The stem 51 slides in a sleeve 52, carried in a plug 53 which is threaded into a bore 54 in the housing 30. A valve spring 55 is provided for normally holding the valve 50 closed. The spring 55 extends between the valve 50 and the plug 53 and is adjusted in tension by threaded adjustment of the plug 53. The plug 53 may be secured in adjusted position by a lock nut 56. This valve also moves in a substantially horizontal plane to make the spring loading independent of the weight of the parts.

In operation of the above described valve, it is noted that the chamber 31 communicates through the vent passage 37 and the vent opening 22 to the atmosphere. The chamber is normally closed from the interior of the tank, however, by means of the valves 40, 50 so as to prevent leakage of the liquid or undue evaporation thereof.

When the pressure within the tank is reduced, as by the withdrawal of liquid therefrom, or by the passage of the plane into a rarefied atmosphere, the valve 40 opens to permit the pressure to become equalized. If, on the other hand, excessive pressure is developed within the tank due to change of atmospheric conditions, change of altitude or to vaporization of the fuel, the pressure relief valve 50 opens to vent the tank through the vent 22 and again equalize the pressure. The spring loading of the valves 40 and 50 may be independently adjusted in accordance with the operation desired. They are normally adjusted to open at a slight pressure differential, but to remain closed when the pressures are equalized.

It is to be noted that the valve assembly is simple and involves a minimum number of parts. Hence, it can be made cheaply, an essential feature for the purpose specified. Furthermore, the valve housing is so designed that the valve and filler cap may be assembled on the plate 21 in the factory before being applied to the tank 10 and may be readily applied to the tank by means of screws or rivets. Inasmuch as the valve mechanism is continuously subjected to liquid gasoline or to gasoline vapor, there is no likelihood of corrosion during use. Hence the parts need not be protected against corrosion.

Although a specific embodiment of the invention has been set forth for purposes of illustration, it is to be understood that the invention is not restricted thereto but that various changes and modifications may be made therein as will be readily apparent to a person skilled in the art. The invention is only to be limited in accordance with the scope of the following claim.

What is claimed is:

In a gasoline tank for airplanes, an outer wall having a vent opening therein, a combination vent and pressure relief valve comprising a housing mounted entirely within said tank, said housing forming a horizontal chamber opening at one end through a pair of valve ports to the interior of said tank and having a top vent opening, an annular flange around said vent opening extending upwardly from said housing and engaging the inside of said wall around said vent opening therein, means securing said flange to said wall, a pair of oppositely acting valves closing said ports, said valves being spring biased in closed position and opening in their respective directions in response to a pressure differential, to vent said tank or to relieve excess pressure therein respectively, means mounting said valves for horizontal opening and closing movement for making their operation independent of the weight of the valve parts when the plane is in normal flying position.

ARTHUR T. NEWELL.